US012023891B2

(12) United States Patent
Kiessner

(10) Patent No.: US 12,023,891 B2
(45) Date of Patent: *Jul. 2, 2024

(54) SYSTEMS AND METHODS FOR FORMING CORRUGATED BOARDS WITH ULTRASOUND

(71) Applicant: Packsize LLC, Salt Lake City, UT (US)

(72) Inventor: Hanko Kiessner, Salt Lake City, UT (US)

(73) Assignee: PACKSIZE LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,893

(22) Filed: May 30, 2023

(65) Prior Publication Data

US 2023/0294376 A1    Sep. 21, 2023

Related U.S. Application Data

(63) Continuation of application No. 17/474,933, filed on Sep. 14, 2021, now Pat. No. 11,724,476.

(Continued)

(51) Int. Cl.
*B31F 1/28* (2006.01)
*B32B 3/28* (2006.01)
*B32B 29/08* (2006.01)

(52) U.S. Cl.
CPC .......... *B31F 1/2818* (2013.01); *B31F 1/2822* (2013.01); *B31F 1/285* (2013.01); *B32B 3/28* (2013.01); *B32B 29/08* (2013.01)

(58) Field of Classification Search
None
See application file for complete search history.

(56) References Cited

U.S. PATENT DOCUMENTS 3,220,911 A * 11/1965 Werner ..................... B31F 1/28
156/473
5,114,509 A * 5/1992 Johnston ............... B29C 66/112
156/472

(Continued)

FOREIGN PATENT DOCUMENTS

DE         2529129 A1      1/1977
EP         1985564 A2 * 10/2008 ............. B65H 45/20

(Continued)

OTHER PUBLICATIONS

International Search Report and Written Opinion received for PCT Patent Application No. PCT/US21/050414, dated Dec. 7, 2021, 11 pages.

(Continued)

*Primary Examiner* — Barbara J Musser
(74) *Attorney, Agent, or Firm* — Quarles & Brady LLP

(57) ABSTRACT

Systems and methods for forming corrugated boards are disclosed. The system includes a single face unit configured to form a single face board having a fluted layer and an outer liner. The system also includes a single face buffer configured to store or hold a length of the single face board. The system has a glue station configured to attach a second outer liner to the single face board to form a single wall board. The system also has an ultrasonic unit configured to apply ultrasonic vibrations to the single wall board. The ultrasonic vibrations are configured to remove moisture from the single wall board, activate, heat, and/or dry an adhesive used to attach the fluted layer and the outer liners, and/or cause the fibers of the fluted layer and the outer liners to weave, intertwine, or otherwise stick together.

14 Claims, 3 Drawing Sheets

Related U.S. Application Data

(60) Provisional application No. 63/152,639, filed on Feb. 23, 2021.

(56) References Cited

U.S. PATENT DOCUMENTS

| | | |
|---|---|---|
| 5,437,749 A | 8/1995 | Pipkorn et al. |
| 5,508,083 A | 4/1996 | Chapman, Jr. |
| 7,220,331 B2 | 5/2007 | Gmeiner |
| 2005/0016690 A1 | 1/2005 | Gmeiner |
| 2006/0278342 A1 | 12/2006 | Baierl et al. |
| 2017/0088380 A1 | 3/2017 | Mark et al. |
| 2022/0266567 A1 | 8/2022 | Kiessner |

FOREIGN PATENT DOCUMENTS

| | | |
|---|---|---|
| GB | 2282464 A | 4/1995 |
| WO | 00/19007 A1 | 4/2000 |
| WO | 2020/077167 A1 | 4/2020 |

OTHER PUBLICATIONS

Final Office Action received for U.S. Appl. No. 17/474,933, dated Dec. 6, 2022, 10 pages.
Machine translation of De 2529129A1 (Year: 1977).
Non-Final Office Action received for U.S. Appl. No. 17/474,933, dated Aug. 3, 2022, 8 pages.

* cited by examiner

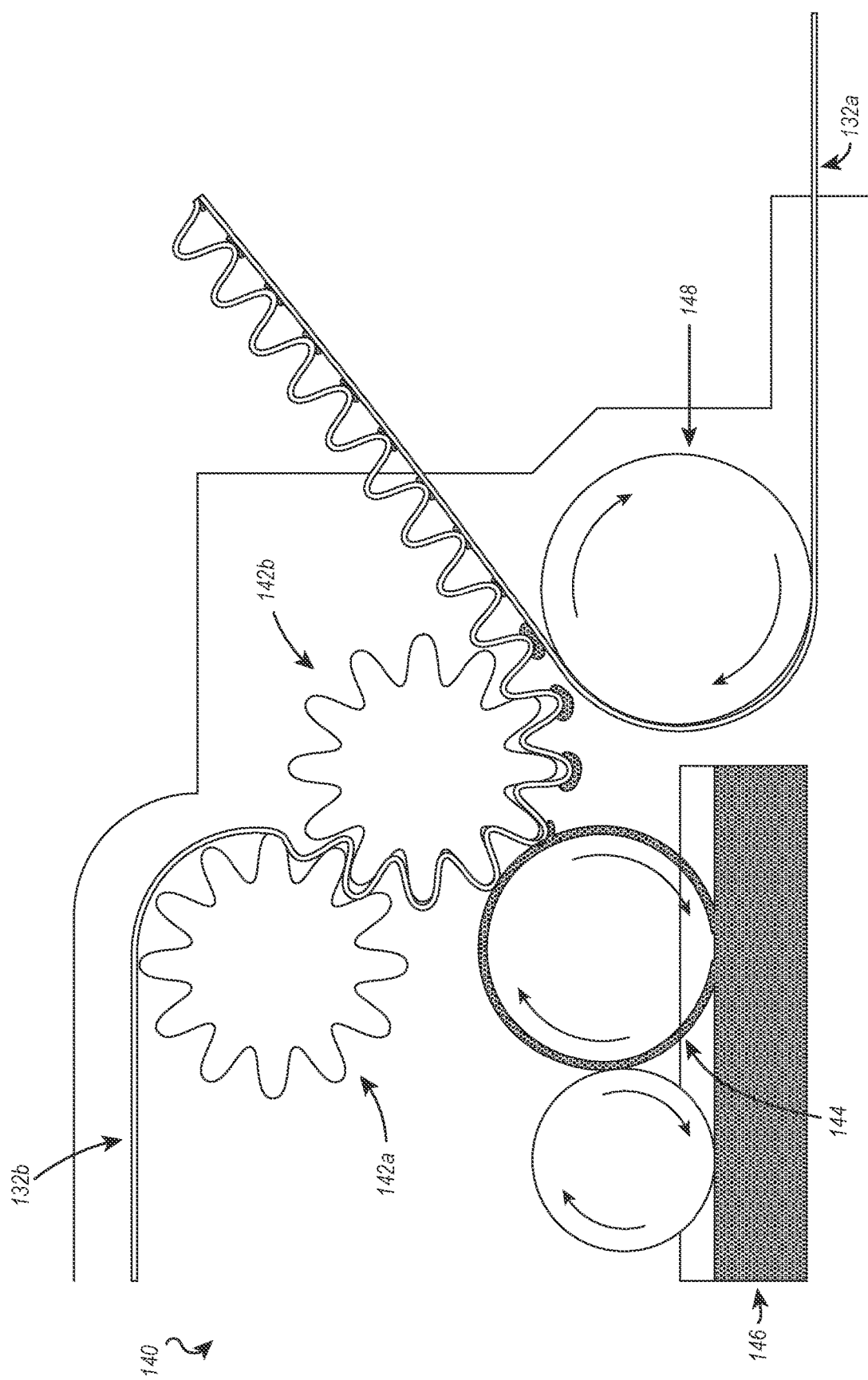

SYSTEMS AND METHODS FOR FORMING CORRUGATED BOARDS WITH ULTRASOUND

CROSS-REFERENCE TO RELATED APPLICATIONS

This application is a continuation of U.S. patent application Ser. No. 17/474,933, filed Sep. 14, 2021, now U.S. Pat. No. 11,724,476, and entitled Systems and Methods for Forming Corrugated Boards with Ultrasound, which claims priority to and the benefit of U.S. Patent Application Ser. No. 63/152,639, filed Feb. 23, 2021, and entitled Systems and Methods for Forming Corrugated Boards with Ultrasound. The disclosures of each of the foregoing applications are incorporated herein by this reference in their entireties.

1. TECHNICAL FIELD

Exemplary embodiments of the disclosure relate to systems, methods, and devices for forming corrugated boards. More specifically, exemplary embodiments relate to systems, methods, and devices for forming corrugated boards using ultrasound.

BRIEF SUMMARY

Exemplary embodiments of the disclosure relate to systems, methods, and devices for forming corrugated boards. More specifically, exemplary embodiments relate to systems, methods, and devices for forming corrugated boards using ultrasound.

For instance, one embodiment is directed to a system for forming corrugated boards. The system includes a single face unit configured to form a single face board having a fluted layer and an outer liner. The system also includes a single face buffer configured to store or hold a length of the single face board. A glue station is configured to attach a second outer liner to the single face board to form a single wall board. An ultrasonic unit is configured to apply ultrasonic vibrations to the single wall board. The ultrasonic vibrations are configured to remove moisture from the single wall board, activate, heat, and/or dry an adhesive used to attach the fluted layer and the outer liners, and/or cause the paper fibers of the fluted layer and the outer liners to weave, intertwine, or otherwise stick together to achieve the bonding.

According to another embodiment, a system for forming corrugated boards includes a single face unit configured to form a single face board having a fluted layer and an outer liner. A glue station is configured to receive the single face board and another sheet material. The glue station is also configured to selectively attach the another sheet material to the single face board to form a single wall board and selectively advance the single face board therethrough without attaching the another sheet material to the single face board. An ultrasonic unit is configured to apply ultrasonic vibrations to the single face board or the single wall board. The ultrasonic vibrations are configured to remove moisture from the single face board or the single wall board, activate, heat, and/or dry an adhesive used to attach layers thereof, and/or cause the paper fibers to weave, intertwine, or otherwise stick together to achieve the bonding.

In still another embodiment, a method for forming corrugated boards includes forming a fluted layer from a first sheet material. The method also includes attaching the fluted layer to an outer liner to form a single face board. Attaching the fluted layer to the outer liner comprises applying a liquid to at least one of the fluted layer or the outer liner and pressing the fluted layer and the outer liner together. The method also includes attaching a second outer liner to the single face board to form a single wall board. Attaching the second outer liner to the single face board includes applying glue to at least one of the single face board or the second liner and pressing the single face board and the second outer liner together. The method also includes applying ultrasonic vibrations to the first single wall board to release moisture therefrom.

These and other objects and features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 3 illustrates an example single face unit that can be used as part of the system of FIGS. 2A and 2B to form single face corrugated boards.

DETAILED DESCRIPTION

While the present disclosure will describe details of embodiments with reference to specific configurations, the descriptions are illustrative and are not to be construed as limiting the scope of the present invention. Various modifications can be made to the illustrated configurations without departing from the spirit and scope of the invention as defined by the claims. For better understanding, like components have been designated by like reference numbers throughout the various accompanying figures.

Figure 1A:
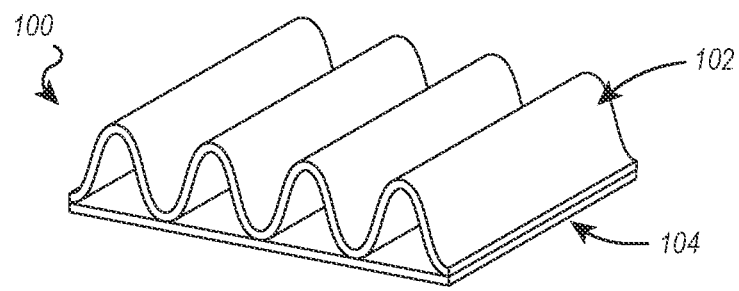
FIG. 1A illustrates a single face corrugated board.
Figure 1B:
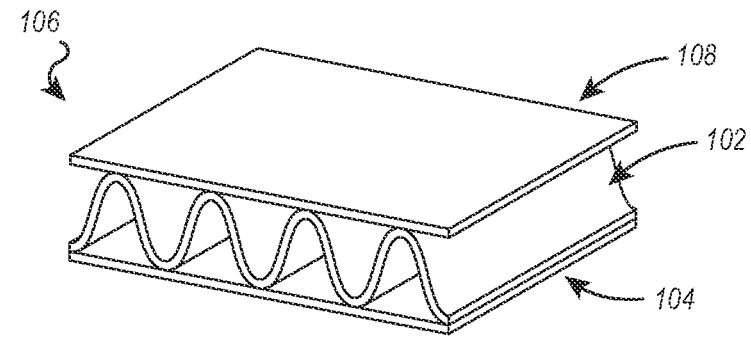
FIG. 1B illustrates a single wall corrugated board.

Shipping and packaging industries frequently use corrugated board to create boxes and other packaging materials, including protective inserts that are placed inside of boxes to further protect items packaged therein. As shown in FIGS. 1A and 1B, there are various types of corrugated boards. The most basic type of corrugated board is referred to as a single face board. As shown in FIG. 1A, a single face board 100 has two layers, a corrugated or fluted layer 102 and an attached liner layer 104. Single face boards are not as durable as the other types of corrugated boards. As a result, single face boards are often used inside of boxes to add extra cushioning or protection to items packaged therein.

FIG. 1B shows a more common type of corrugated board, which is referred to as a single wall board 106. The single wall board 106 is similar to the single face board 100, except that the single wall board 106 also includes a second liner layer opposite the liner layer 104. Thus, the single wall board 106 includes the outer liners 104, 108 and the middle corrugated or fluted layer 102 attached between the outer liners 104, 108. A single wall board provides far superior strength and rigidity compared to single face boards. As a result, single wall boards are commonly used to form shipping boxes. Similar to single wall boards, there are also double wall boards and triple wall boards that include additional fluting and liner layers (with opposing outer liner layers and alternating fluting and liner layers therebetween).

Figure 2A:
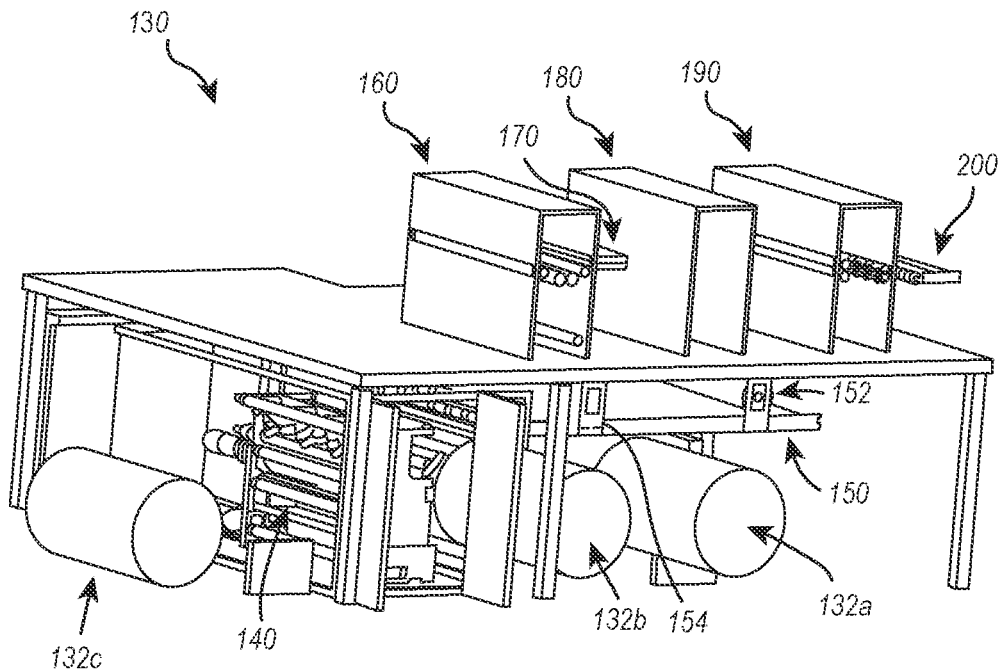
FIGS. 2A and 2B illustrate an example system for forming corrugated boards.
Figure 2B:
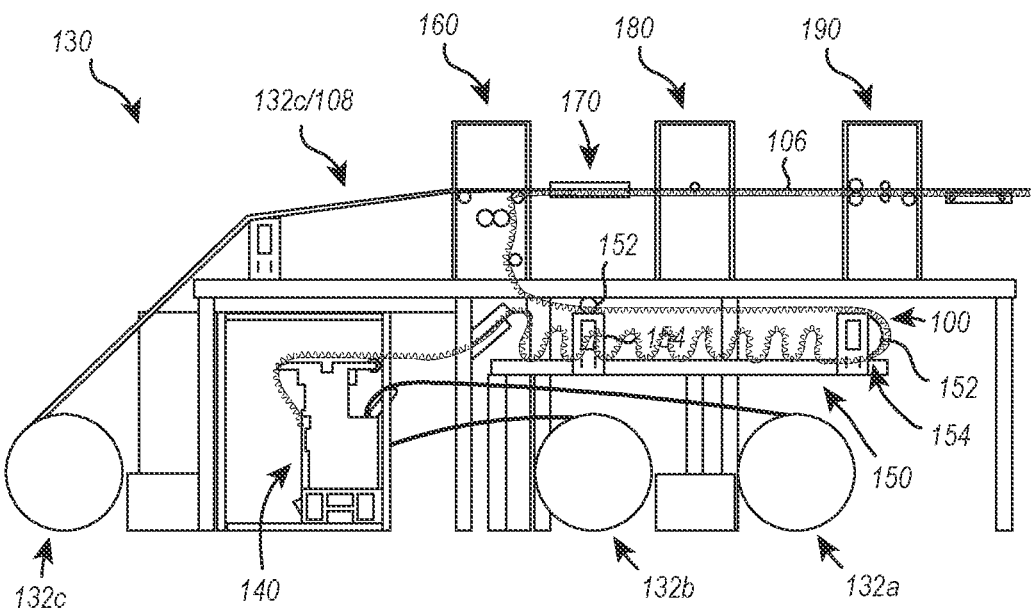

FIGS. 2A and 2B illustrate one example embodiment of a system 130 that can be employed to form corrugated boards, such as the single face board 100 from FIG. 1A and/or the single wall board 106 from FIG. 1B. As can be seen in FIGS. 2A and 2B, the system 130 includes first, second, and third streams or sources of sheet materials 132a, 132b, 132c (shown in rolls). According to the illustrated embodiment, the system 130 also includes a single face unit 140, a single face buffer 150, a glue station 160, an ultrasonic device 170, a cutting unit 180, a creasing unit 190, and a folding unit 200.

Generally, the sheet materials 132a, 132b are fed into the single face unit 140. The single face unit 140 is configured to transform the generally flat sheet material 132b into the fluted layer 102 and attach the fluted layer 102 and the sheet material 132b/outer liner 104 together, thereby forming the single face board 100 (shown in FIG. 2B). After being formed, the single face board 100 may pass through the single face buffer 150. The single face buffer 150 may be configured to hold or store a variable amount of the single face board 100. Thereafter, the single face board 100 and the sheet material 132c/outer liner 108 may pass through the glue station 160 where they may be glued together to form the single wall board 106. The newly formed single wall board 106 may then pass through the ultrasonic device 170, which may be configured to dry one or more of the sheet materials 132a, 132b, 132c and/or the liquids or glues applied thereto. The single wall board 106 may then be cut to a desired length and/or width with the cutting unit 180. Creases may also be formed in the single wall board 106 with the creasing unit 190. The folding unit 200 may be used to fold the single wall board 106 at the newly formed creases, such that the single wall board 106 may be stacked into a fanfold or z-fold bale.

With continued attention FIGS. 2A and 2B, additional details regarding the system 130 will be discussed. As noted, after exiting the single face unit 140, the newly formed single face board 100 may pass through the single face buffer 150. The single face buffer 150 may be configured to allow for a variable amount of single face board 100 to be stored or held within system 130. The single face board 100 held in single face buffer 150 can later be used to form single wall board 106, as will be discussed in further detail below.

The single face buffer 150 may include one or more pulleys 152 around which the single face board 100 may extend. The one or more pulleys 152 may be mounted on one or more carriages 154. As shown in FIG. 2B, the single face board 100 may be fed into the single face buffer 150 such that the single face board 100 folds back and forth on itself prior to engaging pulley 152. The folded single face board 100 may constitute a buffer of single face board. Storing single face board 100 in the folded configuration allows for the single face board 100 to exit the single face buffer 150 at a rate that may be higher than the rate at which the single face unit 140 may produce the single face board 100. Thus, the single face buffer 150 can allow the system 130 to store enough of the single face board 100 therein such that the rate at which the single face unit 140 produces the single face board 100 become less impactful on the overall rate at which the system 130 can make the single wall board 106.

In some embodiments, rather than or in addition to the single face board 100 folding back and forth on itself to create a buffer of single face board, the carriage(s) 154 may move to increase or decrease the length of the single face buffer track. For instance, when one of the moveable carriages 154 is moved to a first position, the length of the single face buffer track may be at a minimum. In contrast, when one of the moveable carriages 154 is moved to a second position (such as shown in FIG. 2B), the length of the single face buffer track may be at a maximum. The position of the moveable carriage(s) 154 may determine the amount of single face board 100 that is stored or held in the single face buffer 150. As the moveable carriage(s) 154 move to increase the length of the single face buffer track, the amount of single face board that can be stored or held in the single face buffer 150 increases.

When the single face board 100 is advanced out of the single face buffer 150 (e.g., by rotating pulley 152) and into the glue station 160, at least one of the carriages 154 may move towards the first position in order to decrease the length of the single face buffer track. Such movement of the carriage 154 allows for the single face board 100 to exit the single face buffer 150 at a rate that may be higher than the rate at which the single face unit 140 may produce the single face board 100. Thus, the single face buffer 150 can allow the system 130 to store enough of the single face board 100 therein such that the rate at which the single face unit 140 produces the single face board 100 become less impactful on the overall rate at which the system 130 can make the single wall board 106.

As noted, after exiting the single face buffer 150, the single face board 100 passes through the glue station 160. In some embodiments, the single face board 100 may simply pass through the glue station 160 without having glue applied thereto or being attached to the sheet material 132c. This may be the case if only the single face board 100 is desired (e.g., not single wall board).

On the other hand, if single wall board 106 is desired, the glue station 160 may glue and attach the single face board 100 to the sheet material 132c/outer liner 108. In particular, both the single face board 100 and the sheet material 132c/outer liner 108 may pass through the glue station 160. At the glue station, glue may be applied to the single face board 100 and/or the sheet material 132c/outer liner 108. For instance, glue may be applied in a manner similar to that used in the single face unit 140, as described below. Alternatively, glue may be sprayed, rolled, or otherwise applied to the single face board 100 and/or the sheet material 132c/outer liner 108. In any event, once the glue is applied, the single face board 100 and the sheet material 132c/outer liner 108 may be pressed together to form the single wall board 106.

In other embodiments, if a single wall board with a dual fluted layer is desired, the sheet material 132c/outer liner 108 may be replaced with a single face board. Like the single face board 100, the single face board may include a fluted layer and an outer liner. The single face board 100 and the other single face board may have their fluted layers facing one another. As the two single face boards pass through the glue station, glue may be applied to one or both fluted layers and the fluted layers may be nested or mated together. Once the glue is applied, the two single face boards may be pressed together to form a single wall, dual fluted board. Additional details regarding single wall, dual fluted boards and the formation thereof is disclosed in U.S. patent application Ser. No. 17/474,869, filed Sep. 14, 2021, and entitled Systems and Methods for Forming Dual Fluted Corrugated Boards, the entire content of which is incorporated herein by this reference.

After exiting the glue station 160, the single face board 100, the single wall board 106, or the single wall, dual fluted board (depending on which is desired) passes through the ultrasonic device 170. The ultrasonic device 170 may be used for one or more functions. For instance, in some embodiments, the ultrasonic device 170 may be used to dry or remove moisture from the sheet materials 132a, 132b, 132c or adhesives. For instance, the ultrasonic device 170 may produce ultrasonic vibrations (and optionally pressure) that cause the sheet materials 132a, 132b, 132c or adhesives applied thereto to release moisture, thereby facilitating drying of the sheet materials 132a, 132b, 132c or adhesives. In some embodiments, the ultrasonic vibrations may cause the paper fibers to weave, intertwine, or otherwise stick together to bond the layers together.

In other embodiments, the ultrasonic device 170 may facilitate bonding of the sheet materials 132a, 132b, 132c together. For instance, as the sheet materials 132a, 132b, 132c (in the form of the single face board 100 and/or the single wall board 106) pass through the ultrasonic device 170, the ultrasonic device 170 may activate the glue that was previously applied thereto. In some embodiments, activating the glue may include heating the glue. The ultrasonic device 170 may produce ultrasonic vibrations (and optionally pressure) that heat the glue enough to enable the glue to bond with another surface. With the glue activated, the ultrasonic device 170 may press the sheet materials 132a, 132b, 132c together (with the activated glue therebetween) and the activated glue may bond the sheet materials 132a, 132b, 132c together.

In still other embodiments, the ultrasonic device 170 may be configured to cure the glue applied to the sheet materials 132a, 132b, 132c, thereby securely bonding the sheet materials 132a, 132b, 132c together as the single face board 100 or the single wall board 106.

It will be appreciated that embodiments may include a first ultrasonic device 170 that is used to activate the glue and a second ultrasonic device 170 that is used to dry or cure the sheet materials and/or glue.

After passing through the ultrasonic device 170, the single face board 100 or the single wall board 106 may be cut to a desired length or width with the cutting unit 180. For instance, the single face board 100 or the single wall board 106 may be cut along its length so as to have a desired width (e.g., 48 inches, 24 inches, etc.). Similarly, the single face board 100 or the single wall board 106 may be cut along its width so as to divide the single face board 100 or the single wall board 106 into individual lengths.

The creasing unit 190 may form creases along the width of the single face board 100 or the single wall board 106. For instance, the creasing unit 190 may compress a portion of the single face board 100 or the single wall board 106 so that the single face board 100 or the single wall board 106 will readily fold along the crease. The creases formed by the creasing unit 190 may extend entirely or partially between opposing edges of the single face board 100 or the single wall board 106. The creases may be formed at regular intervals (e.g., a crease at every 24 inches, 36 inches, 48, inches, etc.) along the length of the single face board 100 or the single wall board 106. In some embodiments, the crease may be formed in alternating fashion. For instance, a first crease may be formed in a first side of the single face board 100 or the single wall board 106 and a second crease may be formed in a second side of the single face board 100 or the single wall board 106 and so on. Forming the creases in such alternating fashion may facilitate subsequent folding of the single face board 100 or the single wall board 106.

After the creases are formed in the single face board 100 or the single wall board 106, the single face board 100 or the single wall board 106 may be folded by the folding unit 200. The folding unit 200 may fold the single face board 100 or the single wall board 106 at the previously formed creases so that the single face board 100 or the single wall board 106 folds back and forth on itself. That is, the single face board 100 or the single wall board 106 may be folded along the creases so that the single face board 100 or the single wall board 106 forms a stack or bale of fanfold or z-fold corrugated board.

Attention is now directed to FIG. 3, which illustrates a more detailed example embodiment of the single face unit 140. As illustrated in FIG. 3, the sheet materials 132a, 132b are fed into the single face unit 140. The sheet material 132b is fed partially around/through the fluting rollers 142a, 142b to fold the sheet material 132b into the fluted configuration shown. More specifically, the fluting rollers 142a, 142b include alternating and mating or nesting peaks and valleys formed on the exterior surfaces thereof. As the fluting rollers 142a, 142b rotate, the sheet material 132b is compressed between the mating or nesting peaks and valleys, thereby folding the sheet material 132b into the fluted configuration.

As sheet material 132b rotates about the fluting roller 142b, a wet or liquid substance or adhesive (e.g., glue, water, liquid starch, etc.) (referred to generally as an adhesive or glue) is applied thereto. In the illustrated embodiment, an adhesive wheel 144 rotates through an adhesive reservoir 146 to pick up an adhesive therein. As the adhesive wheel 144 continues to rotate, the portions thereof with adhesive thereon contact the peaks on one side of the fluted sheet material 132b and transfer the adhesive thereto. With the adhesive applied thereto, the fluted sheet material 132b is brought into contact with the sheet material 132a. A pressure roller 148 and the peaks of the fluted roller 142b apply pressure between the glued peaks of the fluted sheet material 132b and the sheet material 132a to help bond the sheet materials 132a, 132b together.

In some embodiments, the adhesive affects the fibers of the sheet materials 132a, 132b in a way that facilitates bonding between the fibers and, thus, the sheet materials 132a, 132b. For instance, the adhesive may soften an outer fiber layer from the sheet materials 132a, 132b or/or cause the fibers to loosen from one another. As the adhesive dries, sets, or cures, the fibers of the sheet materials 132a, 132b that are contacting one another may weave, intertwine, or otherwise stick together to bond the sheet materials 132a, 132b together.

It will be appreciated that the system and process shown and described in connection with FIG. 3 for forming single face corrugated boards is merely exemplary. Other systems, processes, and devices for forming single face corrugated boards may be used in connection with the disclosed embodiments. As merely one example, adhesive may to applied to the sheet material 132a instead of or in addition to the sheet material 132b. Furthermore, the adhesive may be applied to the sheet material 132a and/or 132b with a spray nozzle instead of or in addition to an adhesive wheel.

According to one example embodiment, a system for forming corrugated boards includes a single face unit configured to form a single face board having a fluted layer and an outer liner; a single face buffer configured to store or hold a length of the single face board; a glue station configured to attach a second outer liner to the single face board to form a single wall board; and an ultrasonic unit configured to apply ultrasonic vibrations to at least one of the single face board or the single wall board, the ultrasonic vibrations being configured to remove moisture from the single face board or the single wall board, activate, heat, and/or dry an adhesive used to attach the fluted layer and one or more of the outer liners, and/or cause the fibers of the fluted layer and one or more of the outer liners to weave, intertwine, or otherwise stick together.

In some embodiments, the single face unit comprises a set of fluting rollers configured to fold a sheet material into the fluted layer, wherein the fluting rollers comprise mating peaks and valleys that are configured to fold the sheet material such that the fluted layer has alternating peaks and valleys.

In some embodiments, the single face unit further comprises a pressure roller, the pressure roller and at least one of the fluting rollers being configured to press the fluted layer and the outer liner layer together to form the single face board.

In some embodiments, the single face unit comprises an adhesive applicator that is configured to apply an adhesive to at least one of the fluted layer or the outer liner of the single face board, the adhesive being configured to attach the fluted layer and the outer liner layer together.

In some embodiments, the single face buffer comprises one or more pulleys about which the single face board can extend.

In some embodiments, at least one of the one or more pulleys is mounted on a moveable carriage.

In some embodiments, movement of the moveable carriage is configured to increase or decrease a length of a track in the single face buffer, wherein the length of the track is related to the length of the single face board that can be stored or held in the system.

In some embodiments, the glue station is configured to apply glue to the single face board or the second outer liner.

In some embodiments, the glue station is configured to press the single face board and the second outer liner together with the glue therebetween to form the single wall board.

In some embodiments, the ultrasonic unit is positioned downstream of the glue station.

In some embodiments, the system further comprises at least one of: a cutting unit configured to cute the single wall board along a length or width thereof; a creasing unit configured to form creases in the single wall board, the creasing extending along at least a portion of a width of the single wall board and being spaced apart at even intervals along the length of the single wall board; or a folding unit configured to fold the single wall board into a stack or bale.

According to one embodiment, an apparatus for forming corrugate boards includes a single face unit configured to form a single face board having a fluted layer and an outer liner; a glue station configured to receive the single face board and another sheet material, the glue station being further configured to: selectively attach the another sheet material to the single face board to form a single wall board; and selectively advance the single face board therethrough without attaching the another sheet material to the single face board; and an ultrasonic unit configured to apply ultrasonic vibrations to the single face board or the single wall board, the ultrasonic vibrations being configured to remove moisture from the single face board or the single wall board, activate, heat, and/or dry an adhesive used to attach layers thereof, and/or cause the fibers of the single face board or the single wall board to weave, intertwine, or otherwise stick together.

In some embodiments, the apparatus further comprises a single face buffer configured to store or hold a length of the single face board.

In some embodiments, the single face buffer is selectively adjustable to hold different lengths of the single face board.

In some embodiments, the single face unit is configured to apply an adhesive to the fluted layer or the outer liner to facilitate attachment between the fluted layer and the outer liner.

According to a method for forming corrugated boards includes forming a fluted layer from a first sheet material; attaching the fluted layer to an outer liner to form a single face board, attaching the fluted layer to the outer liner comprising applying an adhesive to at least one of the fluted layer or the outer liner and pressing the fluted layer and the outer liner together; attaching a second outer liner to the single face board to form a single wall board, attaching the second outer liner to the single face board comprising applying an adhesive to at least one of the single face board or the second liner and pressing the single face board and the second outer liner together; and applying ultrasonic vibrations to the first single wall board to release moisture therefrom.

In some embodiments, the method comprises holding a length of the single face board in a single face buffer prior to attaching the second liner thereto.

In some embodiments, the method further comprises adjusting the length of the single face board that is held in the single face buffer.

In some embodiments, the method further comprises forming creases in the single wall board.

In some embodiments, the method further comprises folding the single wall board at the creases and stacking the single wall board in a stack.

The present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system for forming corrugated boards, the system comprising:
    a glue station configured to attach a single face board and an outer liner together with a liquid to form a single wall board, the glue station being configured to apply the liquid to the outer liner or the single face board and press together the outer liner and the single face board with the liquid therebetween;
    an ultrasonic device configured to apply ultrasonic vibrations to the single wall board, the ultrasonic vibrations being configured to remove moisture from the single wall board and/or dry the liquid used to attach the outer liner and the single face board after the outer liner is attached to the single face board at the glue station, the ultrasonic unit being positioned downstream of the glue station;
    a creasing unit configured to form creases in the single wall board; and
    a folding unit configured to fold the single wall board into a stack or bale.

2. The system of claim 1, further comprising a cutting unit configured to cut the single wall board along a length or width thereof.

3. The system of claim 2, wherein the cutting unit is positioned between the ultrasonic device and the creasing unit.

4. The system of claim 1, wherein the creasing unit is configured to form creases in a first side of the single wall board and creases in a second side of the single wall board.

5. The system of claim 4, wherein the creases formed in the first side and the creases formed in the second side alternated with one another.

6. The system of claim 1, further comprising a single face unit configured to form the single face board, the single face board having a fluted layer and an outer liner.

7. The system of claim 6, wherein the single face unit comprises:
   first and second fluting rollers configured to fold a sheet material into the fluted layer, the first and second fluting rollers comprising mating peaks and valleys that are configured to fold the sheet material such that the fluted layer has alternating peaks and valleys; and
   an adhesive applicator that is configured to apply an adhesive to the fluted layer while the fluted layer is at least partially wrapped around the second fluting roller.

8. The system of claim 7, wherein the single face unit further comprises a pressure roller, the pressure roller and the second fluting roller being configured to press the fluted layer and the outer liner together to form the single face board.

9. An apparatus for forming corrugate boards, the apparatus comprising:
   a single face unit configured to form a single face board having a fluted layer and an outer liner, the single face unit comprising:
      first and second fluting rollers configured to fold a sheet material into the fluted layer, the first and second fluting rollers comprising mating peaks and valleys that are configured to fold the sheet material such that the fluted layer has alternating peaks and valleys;
      an adhesive applicator that is configured to apply an adhesive to the fluted layer while the fluted layer is at least partially wrapped around the second fluting roller; and
      a pressure roller configured to cooperated with the second fluting roller to press the fluted layer and the outer liner together to form the single face board; and
   an ultrasonic device configured to apply ultrasonic vibrations to the single face board to remove moisture from the single face board, the ultrasonic device being disposed downstream of the single face unit such that the ultrasonic device is configured to apply ultrasonic vibrations to the single face board after the pressure roller and the second fluting roller press the fluted layer and the outer liner layer together.

10. The apparatus of claim 9, wherein the pressure roller and the second fluting roller are configured to cooperate press the fluted layer and the outer liner together to form the single face board while the fluted layer is at least partially wrapped around the second fluting roller.

11. A system for forming corrugated boards, the system comprising:
    a single face unit configured to form a single face board having a fluted layer and a first outer liner, the single face unit comprising:
       first and second fluting rollers configured to fold a sheet material into the fluted layer, the first and second fluting rollers comprising mating peaks and valleys that are configured to fold the sheet material such that the fluted layer has alternating peaks and valleys; and
       an adhesive applicator that is configured to apply an adhesive to the fluted layer while the fluted layer is at least partially wrapped around the second fluting roller;
    a glue station configured to attach the single face board and a second outer liner together with a liquid to form a single wall board, the glue station being configured to apply the liquid to the second outer liner or the single face board and press together the second outer liner and the single face board with the liquid therebetween;
    an ultrasonic device configured to apply ultrasonic vibrations to the single wall board, the ultrasonic vibrations being configured to remove moisture from the single wall board and/or dry the adhesive used to attach the second outer liner and the single face board after the second outer liner is attached to the single face board at the glue station, the ultrasonic unit being positioned downstream of the glue station;
    a creasing unit configured to form alternating creases in the single wall board; and
    a folding unit configured to fold the single wall board along the alternating creases and into a stack or bale.

12. The system of claim 11, wherein the single face unit further comprises a pressure roller, the pressure roller and the second fluting roller being configured to cooperate press the fluted layer and the first outer liner together to form the single face board while the fluted layer is at least partially wrapped around the second fluting roller.

13. The system of claim 11, wherein the glue station is downstream of the single face unit, the creasing unit is downstream of the ultrasonic device, and the folding unit is downstream of the creasing unit.

14. The system of claim 11, further comprising a cutting unit configured to cut the single wall board to width or length, the cutting unit being disposed downstream of the ultrasonic device and upstream of the creasing unit.

* * * * *